United States Patent [19]

Wach

[11] Patent Number: 5,530,875
[45] Date of Patent: Jun. 25, 1996

[54] GROUPING OF INTERRUPT SOURCES FOR EFFICIENCY ON THE FLY

[75] Inventor: Joseph L. Wach, Louisville, Colo.

[73] Assignee: Fujitsu Limited, Kanagawa, Japan

[21] Appl. No.: 55,038

[22] Filed: Apr. 29, 1993

[51] Int. Cl.⁶ ........................................ G06F 13/14
[52] U.S. Cl. ............................ 395/737; 395/738
[58] Field of Search ..................... 395/725, 275

[56] References Cited

U.S. PATENT DOCUMENTS

| | | |
|---|---|---|
| 3,719,930 | 3/1973 | Horoshima ........................ 340/172.5 |
| 4,326,249 | 4/1982 | Godsey . |
| 4,332,011 | 5/1982 | Epstein et al. . |
| 4,418,382 | 11/1983 | Larson et al. . |
| 4,566,069 | 1/1986 | Hirayama et al. . |
| 4,571,675 | 2/1986 | Stambaugh et al. . |
| 4,623,244 | 11/1986 | Andrews et al. . |
| 4,742,335 | 5/1988 | Vogt ...................................... 340/518 |
| 4,868,474 | 9/1989 | Lancraft et al. . |
| 4,908,745 | 3/1990 | Ichiyasu et al. . |
| 4,975,836 | 12/1990 | Hirosawa et al. . |
| 5,060,139 | 10/1991 | Theus . |
| 5,134,706 | 7/1992 | Cushing et al. . |
| 5,146,595 | 9/1992 | Fujiyama et al. ........................ 395/725 |
| 5,155,853 | 10/1992 | Mitsuhira et al. . |
| 5,313,640 | 5/1994 | Beardsley et al. ........................ 395/725 |

OTHER PUBLICATIONS

"Microprocessors From Chips to Systems," Rodnay Zaks, SYBEX, Third Edition, 1980, pp. 147–154.

*Primary Examiner*—Jack B. Harvey
*Assistant Examiner*—David A. Wiley
*Attorney, Agent, or Firm*—Curtis, Morris & Safford

[57] ABSTRACT

In a processor-based system, priorities are established among a plurality of interrupt sources by grouping the interrupt sources in accordance with an operating condition of the system. The assignment of the interrupt sources into groups is accomplished through programmable registers which associate flag locations in an interrupt status register with flag locations in a group status register. The operating condition upon which the grouping of interrupt sources is based may be the handling of a particular interrupt, based upon which a next expected interrupt source is assigned to a high priority group.

18 Claims, 4 Drawing Sheets

GROUPING OF INTERRUPT SOURCES FOR EFFICIENCY ON THE FLY

This invention relates to techniques for handling interrupts in a processor-based system, and more particularly to interrupt handling techniques in which a plurality of interrupt sources are combined into at least one group in order to improve the efficiency of interrupt handling routines.

BACKGROUND OF THE INVENTION

It is well known in processor-based systems to utilize so-called "interrupts" to change the program control flow of a processing device such as a microprocessor or a microcontroller to allow the processor to respond to real-time events. In typical applications, such events may include the receipt or transmittal of data by the system controlled by the processor.

When there are a number of different events to which the processor is required to respond, generally an equal number of different routines (referred to as "interrupt handling routines") are required, and it is also necessary for the processor to be able to determine which of the events has occurred so that the appropriate interrupt handling routine is initiated and carried out.

One known technique for determining which of a plurality of interrupt causing events (sometimes referred to as "interrupt sources") has occurred is to assign a separate terminal pin on the processor package to each of the possible interrupt sources. In that case, a signal received on a particular one of the interrupt pins is indicative of the occurrence of an interrupt originating with a respective one of the interrupt sources. However, the number of terminal pins provided with a processor is limited, and, in some processor-based systems, the number of possible interrupt sources may be large. As a result, techniques have been developed which allow a single interrupt pin to be shared by two or more interrupt sources. As is well known, in such a case the shared interrupt pin may or may not be the only pin used for receiving interrupts, and if there are other interrupt pins, those other pins may or may not be shared.

When a single interrupt pin is shared by two or more interrupt sources, the problem of determining from which source the interrupt has originated must again be dealt with. One of the known ways of solving this problem is to provide an interrupt status register with a plurality of storage locations, each of which acts as a flag for signaling that a respective interrupt source has originated the interrupt. When an interrupt signal is received on the shared pin, the processor performs a source determination routine in which it reads one or more of the flags in the interrupt status register and then goes on to perform an appropriate interrupt handling routine based on a determination of which flag or flags have been turned "on". Although this technique has been used with satisfactory results, nevertheless when a large number of interrupt sources share a common interrupt request pin, a relatively long time may be required to check flag-by-flag through the interrupt status register until the source of the interrupt is determined. For example, assuming that (a) sixteen different interrupt sources share a common interrupt request pin, (b) occurrences of the interrupts are randomly distributed among the sources, and (c) N clock cycles are required to check a flag in the interrupt status register, then on average $(17/2) \times N$ clock cycles will be taken up with checking the interrupt status register flags prior to initiation of the needed interrupt handling routine. Again, solutions have been proposed, as in, for example, U.S. Pat. No. 4,908,745 to Ichiyasu et al. in which logic circuits are provided for dividing the interrupt sources into groups and indicating the group which includes the current interrupt source, so that only flags corresponding to interrupts in the indicated group need to be checked. However, the grouping arrangement once established according to the approach used by Ichiyasu et al. is fixed and lacks flexibility. Another known approach to reducing response time and interrupt handling overhead is to assign a higher priority to more frequently encountered interrupt sources.

With the increasing complexity of devices and the desire to further reduce the size of integrated circuit packages, there is a tendency to have more and more interrupt sources sharing a common interrupt request signal pin, and there is a need for more efficient and flexible approaches in determining the source of an interrupt.

OBJECTS OF THE INVENTION

Accordingly, it is an object of the present invention to provide a method and apparatus which eliminate or alleviate the foregoing problems; specifically, it is an object of the invention to provide flexibility and efficiency in grouping, and assigning priorities among, interrupt sources so that a processor performs interrupt handling routines more rapidly, on average, than in prior devices and methods.

SUMMARY OF THE INVENTION

In accordance with the present invention, the foregoing objects are met in a data processing system which receives interrupt signals from a plurality of interrupt sources by provision of a method of establishing priorities among the interrupt sources including the steps of assigning at least one of the interrupt sources to a first priority group as a function of an operating condition then exhibited by the data processing system and assigning the remaining interrupt sources to at least a second priority group.

According to further aspects of the invention, the method includes the additional steps of providing an interrupt register which includes a plurality of storage locations which correspond to respective ones of the interrupt sources, and providing a group register which includes a plurality of storage locations, and the step of assigning at least one of the interrupt sources to a first priority group includes operatively connecting one of the storage locations of the interrupt register with one of the storage locations of the group register.

According to another aspect of the invention, the method includes the step of providing a plurality of association registers equal in number to and corresponding one-to-one with the storage locations of the group register, and the operatively connecting of one of the storage locations of the interrupt register with one of the storage locations of the group register includes sending a programming signal to the association register that corresponds to the storage location of the group register.

In a preferred embodiment of the invention, the plurality of association registers is formed of two association registers, the plurality of storage locations of the group register is formed of two storage locations, and only one of the storage locations of the interrupt register is operatively connected with one of the storage locations of the group register.

In addition, the data processing system has a mode of operation in which a plurality of interrupt signals are received in a predetermined sequence from certain ones of the plurality of interrupt sources and the step of assigning at least one of the interrupt sources to a first priority group is executed when the data processing system responds to the present one of the interrupt signals in the predetermined sequence. The interrupt source assigned to the first priority group is the next interrupt signal in the predetermined sequence after the present interrupt signal.

According to another aspect of the invention a data processing system is provided which includes a processor for receiving and processing interrupt signals originating from a plurality of interrupt sources, an interrupt register for receiving and storing respective interrupt source signals indicative of the interrupt sources, an association circuit for establishing groups of the interrupt sources in response to programming signals from the processor, a group register responsive to the association circuit for receiving and storing a plurality of group signals each of which is indicative of storage in the interrupt register of an interrupt source signal from at least one interrupt source of a corresponding one of the groups of interrupt sources, and means for transmitting an interrupt signal to the processor when the interrupt register receives an interrupt source signal.

According to a further aspect of the invention, the processor is programmed to send the programming signals to the association circuit so that the association circuit establishes the groups of interrupt sources on the basis of an operating condition of the data processing system.

It is not intended that the invention be summarized here in its entirety. Rather, further features, aspects and advantages of the invention will be set forth in or apparent from the following description and drawings.

DETAILED DESCRIPTION OF A PREFERRED EMBODIMENT

Figure 1:
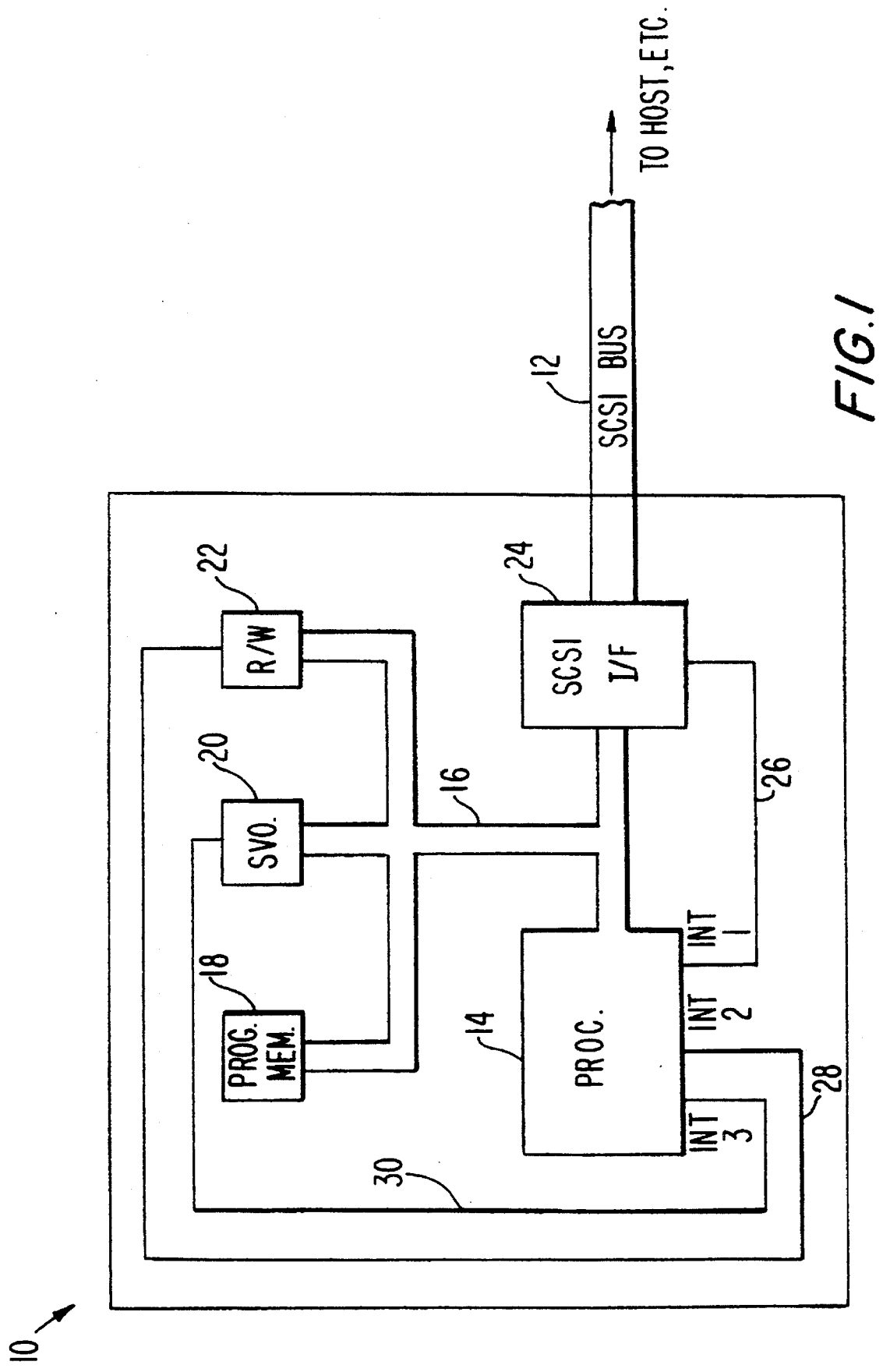
FIG. 1 is a simplified block diagram of the electronic components of a disk drive control device which embodies the apparatus and method of the present invention.

FIG. 1 illustrates, in general terms, a disk drive controller 10 which embodies the method and apparatus of the present invention. As will be understood from the following discussion, the inventive method and apparatus are applicable to many other types of processor-based electronic devices in addition to the disk drive controller described herein.

Disk drive controller 10 is, in a preferred embodiment, of the type which is adapted for coupling to the well-known standard SCSI (Small Computer Standard Interface) bus, represented by reference numeral 12 in the drawing.

Disk drive controller 10 includes a processor 14 which controls the operations thereof. Processor 14 is preferably a conventional microcontroller or microprocessor (such as the model MC68332 microcontroller manufactured by Motorola, model H8 microcontroller manufactured by Hitachi or model 196KC manufactured by Intel) with a plurality of terminal pins INT1, INT2 and INT3 for receiving interrupt request signals (hereafter sometimes referred to simply as "interrupt signals"). However, as will be explained below, the inventive method and apparatus may also be applied in association with a processor having only a single interrupt terminal.

Shared bus lines 16 interconnect processor 14 with other components of disk drive controller 10, including a program memory 18, servo control circuitry 20, read/write circuitry 22 and SCSI interface circuit 24.

Program memory 18 is preferably a PROM or other type of conventional storage device which holds the operating program for controlling operation of processor 14. Servo circuitry 20 and read/write circuitry 22 may also be of conventional design. Bus 16 should be understood to represent common address and data connections for the components of disk drive controller 10 and may also be considered to represent common control lines, although it will be appreciated that there may also be dedicated control lines between processor 14 and the other respective components, although such control lines are not shown in the drawing for the purpose of simplifying the same.

It will also be appreciated that processor 14 may be of the type which includes on-board RAM as working memory, or alternatively, circuit 10 may include a separate RAM (not shown in the drawing) connected to processor 14 by bus 16.

Interrupt request lines 26, 28 and 30 respectively connect SCSI interface circuit 24, read/write circuit 22 and servo control circuit 20 with the aforementioned terminals INT1, INT2 and INT3 of processor 14. The interrupt request lines 26, 28 and 30 are for transmitting respective interrupt signals from the circuits 24, 22 and 20 to processor 14.

SCSI interface circuit 24 performs the well-known function of managing the connection of disk drive controller 10, and particularly its internal bus 16, to the external SCSI system bus 12. As will be well understood, the SCSI bus 12 interconnects the disk drive controller 10 with other components of a computer system. Such other components may include, for example, one or more host computers, and one or more other mass storage devices such as other disk drive controllers.

Figure 2:
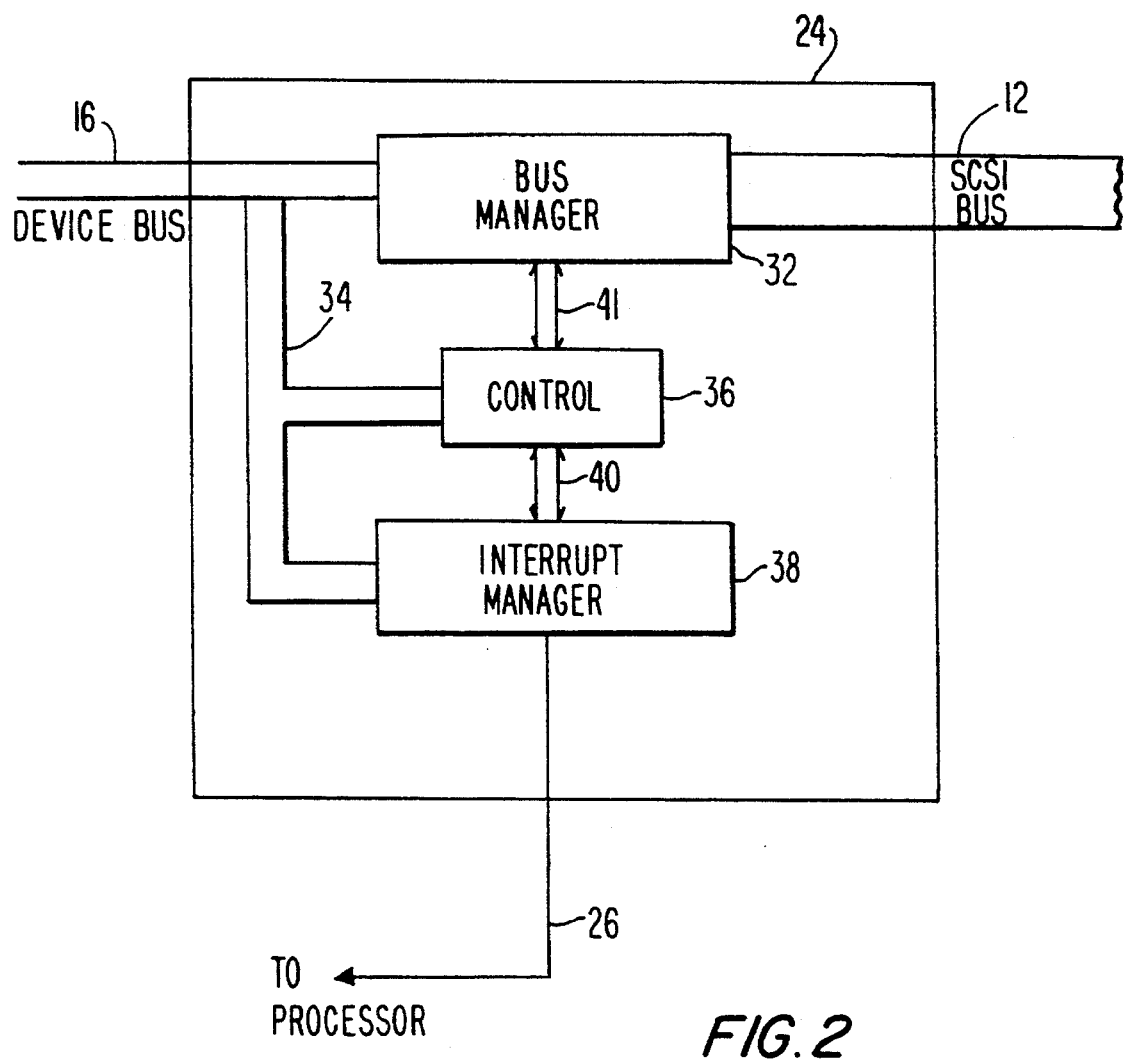
FIG. 2 is a simplified block diagram of a bus interface circuit that is part of the disk drive controller of FIG. 1.

Referring now to FIG. 2, the arrangement of SCSI interface circuit 24 will be described in general terms. Thus, the interface circuit 24 includes bus management logic 32, which is preferably of conventional design and includes data buffers and other circuitry required for interfacing the SCSI bus 12 to the device bus 16. It will be noted that device bus 16 is extended internally to components of interface circuit 24 by bus circuits which are generally identified by the reference numeral 34. SCSI interface circuit 24 also includes control logic 36 and an interrupt manager 38 which are both connected to the internal bus 34 of interface circuit 24. In addition, separate lines 40 connect the control logic 36 and interrupt manager 38, and other separate lines 41 connect bus manager 32 and control logic 36. As will be seen, control logic 36, which is preferably of conventional design, is programmed to control the operations of bus manager 32 and to generate interrupt source signals for storage at interrupt manager 38.

Figure 3:
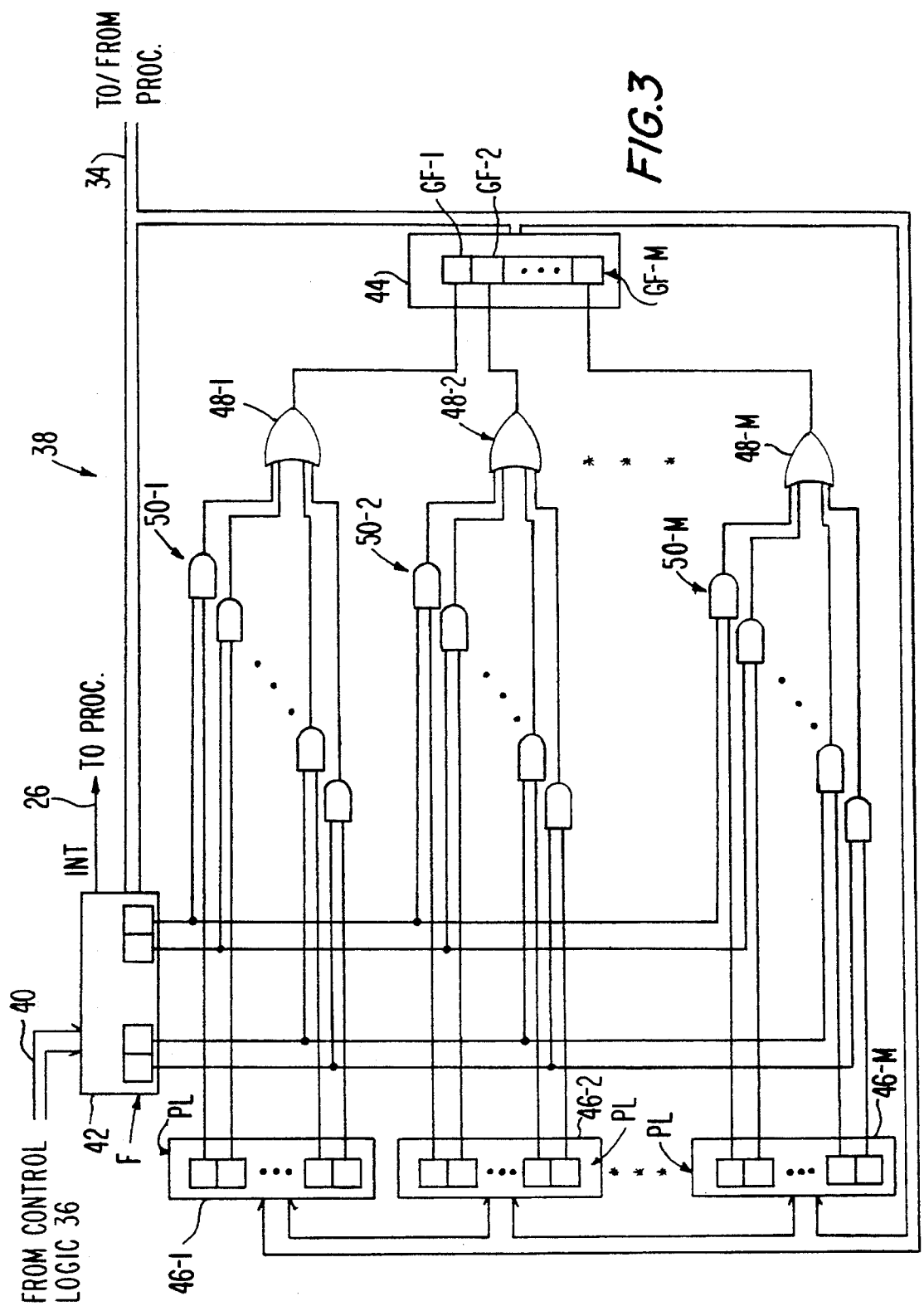
FIG. 3 is a logic circuit diagram of an interrupt manager circuit that is part of the bus interface circuit of FIG. 2.

FIG. 3 shows details of a generalized embodiment of interrupt manager 38 in accordance with the invention. The interrupt manager 38 includes an interrupt status register (or "interrupt register") 42. Register 42 is of conventional design and receives, via lines 40, signals from control logic 36 which set one or more of the flags represented in storage locations F of register 42. As is also conventional, processor 14 is connected to register 42 via bus 34 so that the storage locations F can be read by processor 14. In addition, register 42 is arranged to provide an interrupt request signal to processor 14 via line 26 when any one or more of the locations F are set. One way this can be done is to have outputs from all of the locations F connected to the inputs of an OR gate (not shown), with the output of the OR gate connected to line 26.

As is conventional, the number of storage locations F in register 42 is equal to the number of interrupt sources, any one of which may cause the transmission of the interrupt signal to processor 14. Also, the locations F correspond one-to-one to the interrupt sources.

Also included in the interrupt manager 38 is a group flag register (also referred to as a "group register") 44. Group register 44 has m flag storage locations GF, where m is an integer that is greater than or equal to two. For each of the m locations GF, interrupt manager 38 also has a corresponding association register 46 and an OR gate 48. Each of the association registers 46 has programmable storage locations PL which are equal in number to the storage locations F in interrupt register 42. As to each of the association registers 46, the storage locations PL thereof are connected, as described below, so as to correspond one-to-one to the storage locations F of interrupt register 42.

Each of the OR gates 48 has as many inputs as the interrupt register 42 (and each association register 46) has storage locations. Also, there is a group 50 of two-input/one-output AND gates associated with each of the OR gates 48. Each of the groups of AND gates is formed of the same number of AND gates as interrupt register 42 (and each association register 46) has storage locations. Each of the AND gates has its output connected to a respective input of the corresponding OR gate. One input of each AND gate of the group is connected to a respective storage location F of interrupt register 42 and the other input of each AND gate is connected to a corresponding storage location PL of the association register 46 which corresponds to the group's OR gate 48.

Each of the storage locations GF of group register 44 can be read by processor 14 via bus 34 as, for example, in the manner by which processor 14 reads the storage locations F of interrupt register 42. In addition, processor 14 is connected via bus 34 to each of the association registers 46 in such a manner that processor 14 can program (i.e., set to a value "1" or reset to a value "0") each of the storage locations PL of each of the association registers 46.

It is to be understood that bus 34 contains both address and data lines and that each of the registers 42, 44 or 46 includes decoding circuitry or the like for decoding addresses to select the respective registers for reading or programming, as the case may be, by processor 14. As will be seen, the programmable association registers 46 allow for great flexibility in forming groups of interrupt sources and establishing priorities among interrupt sources. This flexibility may be put to use for the purpose of grouping interrupt sources and establishing interrupt priorities adaptively or "on-the-fly", and a detailed example of adaptive grouping of interrupts will be described below, but first a more general example, in which the interrupt grouping is not necessarily adaptive, will be given with reference to FIG. 3.

STATIC GROUPING OF INTERRUPTS FOR REDUCED INTERRUPT HANDLING OVERHEAD

For the purpose of this general example, it will be assumed that there are 2m storage locations F in interrupt register 42, corresponding to 2m interrupt sources. According to this example the interrupt sources are to be divided into m groups of two interrupt sources each in order to promote more efficient determination of the interrupt source. In that case, and during a device initialization procedure, for example, the first two locations PL of association register 46-1 may be set by programming signals from processor 14 to store the value "1" with the other locations PL of register 46-1 being programmed to store "0". As a result, two interrupt sources, represented by the first two storage locations F of interrupt register 42, are assigned to a first group represented by storage location GF-1 of group register 44. Similarly, the second two locations PL of association register 46-2 are set to "1" with the remaining locations of register 46-2 reset to "0", so that a second pair of interrupt sources, represented by the second two of the storage locations F, is associated with a group represented by location GF-2 of group register 44. This pattern is continued through the remaining association registers 46 so that each succeeding pair of interrupt sources is grouped into a corresponding interrupt group. According to this approach, when an interrupt signal is received on line 26, the processor 14, by reading register 44, identifies which group includes the interrupt source that originated the current interrupt. Based on that determination, the processor 14 checks one, and then if necessary the other, of the two locations F which correspond to the group identified by reading register 44. As a result, the average number of required register checks (assuming the interrupts are randomly generated among the interrupt sources) is $1+((m+1)/2)$, instead of $m+\frac{1}{2}$ ($=(2m+1)/2$) as would be the case if there were no grouping of the two m interrupt sources. This results in improved response time and lower overhead during interrupt handling. For example if m=8, the average number of register checks is 5.5 per interrupt instead of 8.5.

The programmability of association registers 46 provides significant advantages as compared to prior art interrupt grouping circuitry. For example, with the interrupt manager 38 of FIGS. 2 and 3, a redefinition of interrupt groupings and priorities can be accomplished by a software update, without redesigning and replacing the grouping hardware. This would be especially useful when a program upgrade requires or would be aided by regrouping or reprioritizing interrupts.

ADAPTIVE GROUPING OF INTERRUPTS FOR GREATER EFFICIENCY

Still greater advantages can be achieved by adaptively establishing groups and priorities among interrupt sources on the basis of operating conditions. For example, groupings and priorities can be established on the basis of known or anticipated patterns or sequences of interrupts. In effect, the processor 14 can program the association registers 46 so that disk drive controller 10 "expects" a certain interrupt source to originate the next interrupt signal. When the next interrupt occurs, the "expectation" can be quickly confirmed and the expected interrupt can then be handled very expeditiously and with a minimum of overhead. Checking for other interrupt sources can be minimized.

In some operating modes of the disk drive controller 10, interrupts can be expected to be received in a predetermined sequence of interrupt sources. One such mode occurs when one or another of the host computers to which the disk drive controller 10 is connected via SCSI bus 12 selects the particular disk drive controlled by disk drive controller 10 for a data read operation (that is, reading data from the disk), for example.

TYPICAL READ-FROM-DISK OPERATION

Such a read-from-disk operation begins when the host asserts a signal on the SCSI bus 12 which is indicative of selection of the disk drive controlled by controller 10 (FIG. 1). In response to that signal, the control logic 36 of SCSI interface circuit 24 generates the interrupt source signal corresponding to the "selected" interrupt source. The corresponding storage location F of interrupt register 42 is accordingly set to the value "1". The processor 14 then carries out an appropriate interrupt handling routine in response to the "selected" interrupt (details of interrupt source determination for this and other interrupts discussed in this description of the read operation will be provided below) and the interface circuit 24 performs the customary "hand shake" procedure with the selecting host and then receives a number of bytes of data which make up a command. When the receipt of the data from the host via the SCSI bus 12 is complete, control logic 36 generates a "transfer done" interrupt, which the processor 14 recognizes by, for example, reading the received command bytes. If the command bytes as received are indicative of further bytes to follow, then the processor will control interface circuit 24 to remain available for receiving the additional bytes. When all of the command bytes have been received, as determined by the processor 14, and are recognized, as assumed in this case, to be a "read from disk" command, then the processor 14 activates interface circuit 24 to communicate with the selecting host that the controller 10 should be disconnected from the SCSI bus 12. After the interface circuit 24 has sent this communication, control logic 36 generates a "transfer done" interrupt which is recognized by processor 14. The SCSI bus 12 is then disconnected from controller 10 and, upon detecting this condition, the control logic 36 generates a "disconnected" interrupt, which is processed by processor 14 by, for example, overseeing the requested physical read of data from the disk controlled by disk drive controller 10.

When the physical read from the disk is completed, processor 14 directs the interface circuit 24 to request communication with the host. In response to this request, the host seizes the SCSI bus 12 for communication with the disk drive controller 10 and transmits a message reselecting disk drive controller 10. When this occurs, control logic 36 of interface circuit 24 generates a "reselect complete" interrupt, which is processed by processor 14 by initiating transfer of the data to the host by means of a conventional DMA procedure. When the data transfer to the host is complete, the control logic 36 initiates a "transfer done" interrupt to be recognized by the processor 14. Processor 14, in turn, directs that the status "good" be communicated to the host. When communication of the status "good" is complete, a "transfer done" interrupt is generated by control logic 36 and processed by processor 14, which transmits a "done" message to the host via interface circuit 24. Upon completion of the sending of that "done" message, the control logic 36 generates a "transfer done" interrupt, which the processor 14 responds to by directing interface circuit 24 to release the SCSI bus 12. When the SCSI bus 12 has been released, the control logic 36 generates a "bus free" interrupt to be processed by the processor 14.

From the foregoing it will be seen that not only is it possible to predict the types of interrupts that will occur during a read-from-disk operation, but it is also possible to predict the order of those interrupts, and thus when one interrupt has occurred, the processor 14 can be programmed to anticipate what the next interrupt will be. For example, and summarizing the latter part of the operation described above, after the "disconnected" interrupt, it can be anticipated that the next interrupt will be "reselect complete". After the "reselect complete" interrupt, three successive "transfer done" interrupts can be anticipated. And after the last of the three "transfer done" interrupts, a "bus free" interrupt can be anticipated.

In a preferred embodiment of the invention, in order to take advantage of the predictability of the next interrupt that is likely to occur on the basis of the current interrupt that is being handled, the interrupt sources are grouped adaptively or "on-the-fly" in response to the operating condition of the disk drive controller 10. More specifically, an interrupt handling routine in which a current interrupt is being processed includes reprogramming of the association registers 46 so that two groups of interrupts are formed, with a first priority group having only a single interrupt which is the next interrupt that can be anticipated to occur following the interrupt which is currently being handled, and a second group of interrupts including all of the other possible interrupt sources. It will be appreciated that in this embodiment the association registers 46 may be formed of only two association registers 46-1 and 46-2, and group register 44 may have only 2 storage locations GF-1 and GF-2, since only two groups of interrupt sources are to be formed. Similarly, in this case, there would be only two OR gates 48-1 and 48-2, and only two groups of AND gates 50-1 and 50-2.

Further, in order to arrange that the first group to be formed of only one interrupt while the second group has all the other interrupts assigned thereto, it will be appreciated that only a single one of the storage locations PL of association register 46-1 which corresponds to the next anticipated interrupt is set to "1" and all of the other storage locations of association register 46-1 are set to "0". Also, association register 46-2 is programmed so that its storage location PL which corresponds to the next anticipated interrupt source is reset to "0" and all of its other storage locations PL are set to "1".

INTERRUPT HANDLING WITH ADAPTIVE PROGRAMMING OF ASSOCIATION REGISTERS

An interrupt handling routine performed by processor 14 and which includes adaptive or "on-the-fly" grouping of interrupt sources will now be described with reference to FIG. 4. The routine of FIG. 4 starts upon the receipt of an interrupt signal on line 26 (step 100). It will initially be assumed that the source of the interrupt is the next anticipated interrupt, i.e. the interrupt source which has been assigned, by itself, to group 1. It will further be assumed that the disk drive controller 10 is in the course of performing the read-from-disk operation as described above, and that the particular anticipated interrupt is the "disconnected" interrupt discussed above in connection with that data-reading operation.

Accordingly, at the outset of the interrupt handling routine which begins with step 100, the processor 14 inquires at step 102 whether the interrupt source for the interrupt now being handled is the "anticipated" interrupt that has been assigned to group 1. This is accomplished by reading the status of location GF-1 (i.e., the first group flag) in the group register 44. In accordance with the assumption made above, the storage location F of interrupt register 42 corresponding to the "disconnected" interrupt has been set to "1" and that storage location F had been previously associated by means of association register 46-1 with the location GF-1 of group register 44. Therefore, a value "1" is held in location GF-1. As a result, the inquiry made at step 102 is answered in the affirmative, so that the interrupt handling routine advances to step 104, at which it is determined whether an interrupt has also been asserted by another interrupt source, i.e. one that is assigned to group 2. Again this determination is made by reading the group register 44, and particularly the location GF-2 thereof, which represents the second group flag. Assuming that no interrupt source assigned to group 2 (i.e. no interrupt source other than the anticipated interrupt source "disconnected") has been asserted, the routine proceeds to step 106 at which the processor 14 handles the interrupt. Since processor 14 "knows" that the "disconnected" interrupt is the only interrupt source assigned to group 1, there is no need to check interrupt register 42.

As mentioned above, the handling of the "disconnected" interrupt, in this case, entails performing the physical read from the disk and then directing the interface circuit 24 to request communication with the host that requested the data read. The interrupt handling routine then advances to step 108, at which the processor 14 reprograms the association registers 46-1 and 46-2 to reflect which interrupt source is expected to generate the next interrupt. According to the sequence described before, the next anticipated interrupt after "disconnected" is the "reselect complete" interrupt. Therefore, processor 14 sets to "1" the storage location PL of association register 46-1 which corresponds to the "reselect complete" interrupt source and processor 14 also programs association register 46-2 so that all of the storage locations PL, except the location corresponding to the "reselect complete" interrupt source, are programmed to have the value "1", with the location PL of association register 46-2 corresponding to "reselect complete" being programmed to have the value "0".

Step 108 may be implemented by a look-up table from which programming signals for the association registers 46 are retrieved on the basis of the present interrupt.

Following step 108, the interrupt handling routine ends with, for example, a return to a main line or a monitor program (step 110).

Let it now be assumed, contrary to the previous assumption, that the interrupt source of the interrupt received at step 100 ("start") is not the anticipated interrupt source "disconnected". In that case, the inquiry at step 102 is answered in the negative and the routine advances to step 112, wherein processor 14 reads the locations F in interrupt status register 42 in order to determine which interrupt source or sources have caused the current interrupt. Since the processor "knows" that the "disconnected" interrupt source is not currently assigned to group 2, the flag location F in interrupt register 42 corresponding to the "disconnected" interrupt source need not be checked.

Following step 112 is step 114, at which processor 14 handles the group 2 interrupt source or sources which initiated the current interrupt. The routine then advances to step 108, at which the processor 14, if appropriate, reprograms the association register 46 to reflect the next interrupt source which is anticipated in view of the group 2 interrupt or interrupts that have just been handled. It will be appreciated that in some cases the "disconnected" interrupt source will remain the next expected interrupt, so that no reprogramming will be required. After step 108 the routine again returns to the main line program.

Let it next be assumed that the anticipated interrupt source assigned to group 1 as well as at least one of the interrupt sources of group 2 have both been asserted.

In this case, after starting at step 100, an affirmative determination is made at step 102 and then another affirmative determination is made at step 104, and then, in a preferred embodiment, the routine proceeds to the step 112 as described above, because group 2 includes one or more high priority interrupt sources, such as a "reset" interrupt, that must always handled, regardless of which interrupt source has been assigned to group 1. Steps 114, 108, and 110 then follow, as before.

It should be noted that reprogramming of association registers 46 in response to an operating condition, such as the nature of a current interrupt, allows a next expected interrupt source usually to be assigned to group 1. This, in turn, provides for a minimization of the overhead in interrupt handling during normal operation of disk drive controller 10 and increases the overall efficiency of the operating program.

Figure 4:
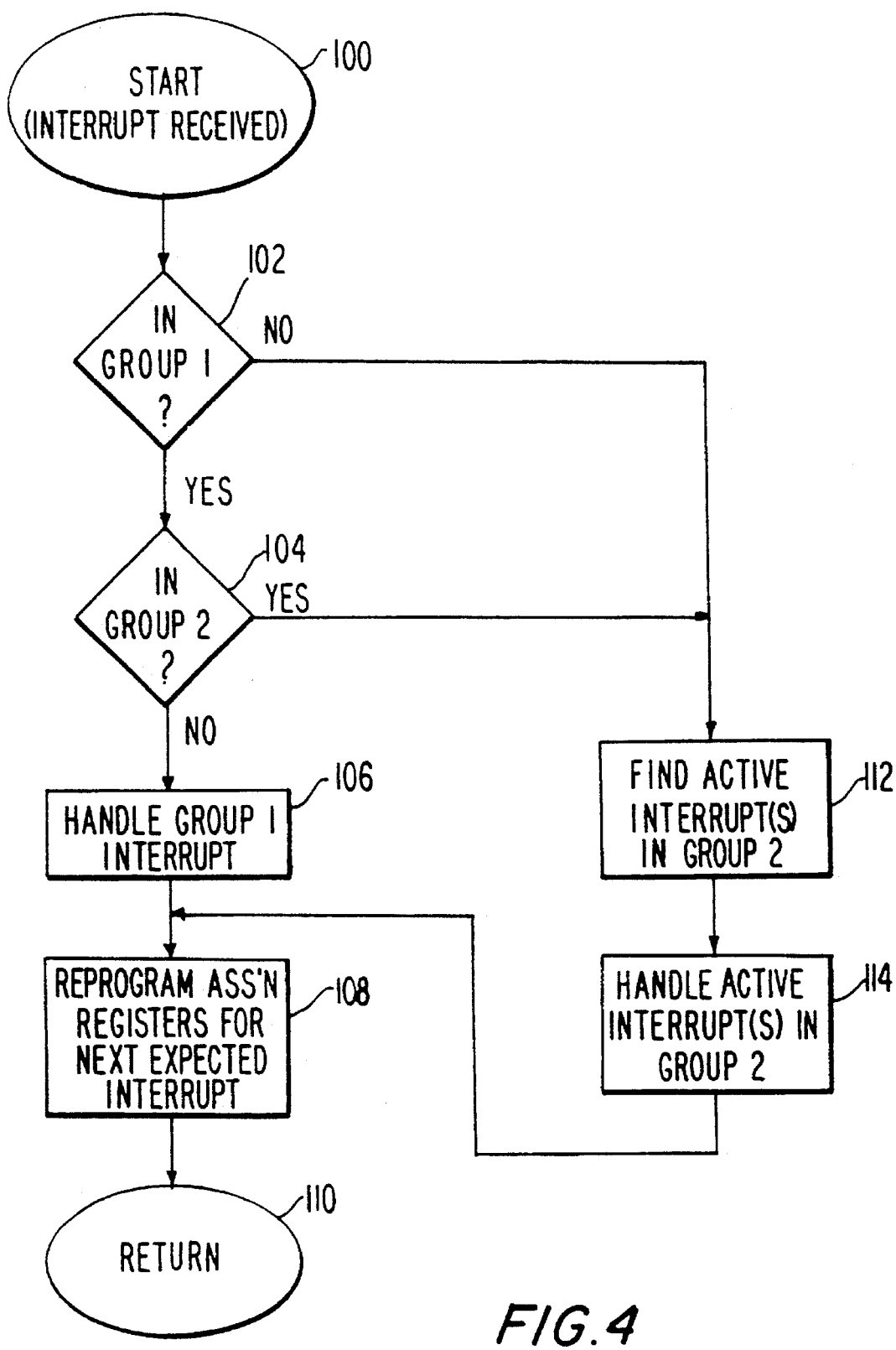
FIG. 4 is flow chart that illustrates a software routine that is carried out by the processor of the disk drive controller of FIG. 1 upon receipt of an interrupt request signal.

A number of variations to the interrupt handling routine of FIG. 4 will be apparent. For example, if it is desired to assign absolute priority to the interrupt source assigned to group 1, an affirmative determination at step 102 can lead directly to step 106, with the group 2 interrupt sources being checked and handled only if the determination at step 102 is in the negative.

It also is contemplated to reverse the order of steps 102 and 104, and/or to arrange the routine of FIG. 4 so that a negative determination at both of steps 102 and 104 leads immediately to step 110 (return to mainline program), in effect disregarding as spurious the interrupt signal which initiated the routine.

Examples of high priority interrupts that may, for example, be assigned to group 2 are "parity error detected", "phase error detected", or "attention from host", with the latter indicating that a host computer wishes to send a message to the disk drive controller 10. The significance of these interrupt sources is known to those who are skilled in the art, and so need not be described further.

It should be noted that some interrupts may be "permanently" assigned to group 2 by simply hard wiring the output of the corresponding storage location F of interrupt register 42 to the corresponding input of OR gate 48-2. In this case, the corresponding AND gate may be omitted from the group 50-2 of AND gates, and, the corresponding location PL of association register 46-2 may be omitted or is a "don't care" in terms of the programming of the association register 46-2 by processor 14. Of course, instead of directly hard wiring the output of that storage location F to the input of OR gate 48-2, the output of the storage location F can be coupled to both inputs of a corresponding AND gate.

MASKING OF INTERRUPTS BY USING ASSOCIATION REGISTERS

Masking of interrupts is a well known concept and may readily be included in the interrupt manager 38 shown in FIG. 3 by adding a mask register and associated logic gates upstream from interrupt status register 42, utilizing, for example, the circuit arrangement shown at page 148 of *Microprocessors, From Chips to Systems*, by Rodnay Zaks (3rd ed., Sybex, 1980).

It should be noted that another approach to masking of interrupts can be applied in interrupt manager 38, without using a mask register. According to this approach, the line 26 is taken out from group register 44 rather than interrupt register 42, with the interrupt request signal generated when any one or more of the locations GF are set. Further, when it is desired to mask a given one of the interrupt sources, processor 14 sends programming signals to the association registers 46 such that the value "0" is stored in the respective location PL corresponding to the interrupt source to be masked in all of the association registers 46. In other words, the interrupt source to be masked simply is omitted from all of the groups. Of course, this masking approach could be applied to more than one interrupt source at the same time, and, in fact, all interrupts could be masked by storing zeros in every location PL of every association register 46.

It should also be noted that even if it is not desired to mask interrupts through programming of the association registers 46, it would still be possible to have the interrupt request signal generated, and line 26 originate, from group register 44 rather than interrupt register 42.

Referring again to FIG. 1, it will be recalled that processor 14 is shown as having three interrupt request terminals INT1, INT2 and INT3. However, it will be understood that in fact the processor 14 may have more or fewer interrupt request terminals than three and that one of the interrupt request terminals may be shared by two or all of the servo control circuit 20, the read/write circuit 22 and the SCSI interface circuit 24. In the case of sharing of an interrupt request terminal by two or more of these three circuits, it will be appreciated that an interrupt manager circuit like that shown in FIG. 3 may be used to manage interrupt sources, and to control prioritizing and grouping of interrupt sources, originating from all of the circuits sharing the shared interrupt request terminal. It will also be recognized, as an alternative, that the circuits 20 and 22 may each include an interrupt manager circuit like interrupt manager circuit 38 of FIGS. 2 and 3.

Although the present invention has been described as embodied in a disk drive controller, it should be understood that the invention is applicable to many other types of processor-controlled system, and particularly to those in which a number of interrupt sources share a common interrupt request signal terminal on the processor circuit package. The invention is especially beneficial in systems in which predetermined sequences of interrupts are experienced.

The above description of the invention is intended to be illustrative and not limiting. Various changes or modifications in the embodiments described may occur to those skilled in the art and these can be made without departing from the spirit or scope of the invention.

As the term "group" is used in the following claims, it should be understood to include a group which may have only a single interrupt source.

What is claimed is:

1. In a data processing system which receives interrupt signals from a plurality of interrupt sources in a predetermined sequence, a method of establishing priorities among said interrupt sources, comprising the steps of:

assigning one of said interrupt sources to a first priority group on the basis of said predetermined sequence;

assigning other interrupt sources to a second priority group; and selectively reassigning said interrupt sources to the first or second priority groups when responding to said interrupt sources and when the predetermined sequence changes.

2. A method according to claim 1; further comprising the steps of:

providing an interrupt register which includes a plurality of storage locations which correspond to respective ones of said interrupt sources; and providing a group register, which includes a plurality of storage locations;

and wherein said step of assigning at least one of said interrupt sources to a first priority group includes operatively coupling one of said storage locations of said interrupt register with one of said storage locations of said group register.

3. A method according to claim 2; further comprising the step of providing a plurality of association registers, equal in number to and corresponding one-to-one with said storage locations of said group register, and wherein said operatively coupling of one of said storage locations of said interrupt register with one of said storage locations of said group register includes sending a programming signal to the one of said association registers that corresponds to said one of said storage locations of said group register.

4. A method according to claim 3; wherein said plurality of association registers consists of two association registers, said plurality of storage locations of said group register consists of two storage locations, and said one of said storage locations of said interrupt register is the only one said storage locations of said interrupt register that is operatively connected with said one of said storage locations of said group register.

5. A method according to claim 3; wherein each of said association registers includes a plurality of storage locations that is equal in number to said plurality of storage locations of said interrupt register.

6. A method according to claim 1; wherein said first priority group consists of a single interrupt source assigned thereto.

7. In a data processing system which exhibits different operating conditions at different times and which receives interrupt signals anticipated to be in a predetermined sequence from a plurality of interrupt sources, a method of establishing priorities among said interrupt sources, comprising the steps of:

providing an interrupt register which includes a plurality of storage locations which correspond to respective ones of said interrupt sources;

providing a group register which includes a plurality of storage locations;

providing a plurality of programmable association registers, equal in number to and corresponding one-to-one with said storage locations of said group register;

initially programming said association registers on the basis of a presently anticipated one of said interrupt signals so that each of said storage locations of said interrupt register is associated with a respective one of said storage locations of said group register, and at least one of said storage locations of said group register has associated therewith a plurality of said storage locations of said interrupt register; and reprogramming said association registers on the basis of a next anticipated interrupt signal in said predetermined sequence so as to change associations made in said initial programming step among said storage locations of said interrupt and group registers.

8. In a data processing system which exhibits different operating conditions at different times and which receives interrupt signals from a plurality of interrupt sources, a method of establishing priorities among said interrupt sources, comprising the steps of:

providing an interrupt register which includes a plurality of storage locations which correspond to respective ones of said interrupt sources;

providing a group register which includes a plurality of storage locations;

providing a plurality of programmable association registers, equal in number to and corresponding one-to-one with said storage locations of said group register;

initially programming said association registers so that each of said storage locations of said interrupt register is associated with a respective one of said storage locations of said group register, and at least one of said storage locations of said group register has associated therewith a plurality of said storage locations of said interrupt register; and reprogramming said association registers on the basis of the operating condition exhibited by said data processing system at the time of said reprogramming so as to change associations made in said initial programming step among said storage locations of said interrupt and group registers, said step of reprogramming being carried out by said data processing system when responding to one of said interrupt signals.

9. A method according to claim 7; wherein:

said plurality of storage locations of said group register consists of two storage locations of which one corresponds to a first priority group and the other corresponds to a second group;

said plurality of association registers consists of two association registers;

in said initial programming step only a first one of said storage locations of said interrupt register is associated with said storage location which corresponds to said first priority group and all other storage locations of said interrupt register are associated with said storage location which corresponds to said second group; and in said reprogramming step a second one of said storage locations of said interrupt register is associated with said storage location which corresponds to said first priority group and all other storage locations of said interrupt register, including said first one, are associated with said storage location which corresponds to said second group.

10. A data processing system comprising:

processor means for receiving and processing interrupt source signals originating in a predetermined sequence from a plurality of interrupt sources;

interrupt register means for receiving and storing respective interrupt source signals indicative of said interrupt sources;

association means for establishing groups of said interrupt sources in response to programming signals from said processor means;

group register means responsive to said association means for receiving and storing a plurality of group signals each of which is indicative of storage in said interrupt register means of an interrupt source signal from at least one interrupt source of a corresponding one of said groups of interrupt sources; and means for transmitting an interrupt signal to said processor means when said interrupt register means receives a present one of said interrupt source signals;

said processor means being programmed to send said programming signals to said association means such that said association means establishes said groups of said interrupt sources on the basis of a next one of said interrupt source signals in said predetermined sequence.

11. A data processing system according to claim 10; wherein said processor means is programmed to send programming signals to said association means such that said groups of said interrupt sources are changed during operation of said data processing system.

12. A data processing system comprising:

processor means for receiving and processing interrupt signals originating from a plurality of interrupt sources;

interrupt register means for receiving and storing respective interrupt source signals indicative of said interrupt sources and including a plurality of storage locations which correspond one-to-one with said interrupt sources;

association means for establishing groups of said interrupt sources in response to programming signals from said processor means;

group register means responsive to said association means for receiving and storing a plurality of group signals each of which is indicative of storage in said interrupt register means of an interrupt source signal from at least one interrupt source of a corresponding one of said groups of interrupt sources; and means for transmitting an interrupt signal to said processor means when said interrupt register means receives an interrupt source signal;

said processor means being programmed to respond to receipt of said interrupt signal from said means for transmitting by:

reading said group register means to identify the group which includes the particular interrupt source in response to which said means for transmitting transmitted said interrupt signal;

identifying which of said plurality of interrupt sources is said particular interrupt source by reading only the storage locations of said interrupt register means which correspond to the interrupt sources included in said identified group;

performing a predetermined routine for handling an interrupt originating from said identified interrupt source; and transmitting programming signals to said association means on the basis of said identification of said particular interrupt source such that said association means establishes said groups of said interrupt sources and changes said groups of said interrupt sources during operation of said data processing system.

13. A data processing system according to claim 10; wherein:

said interrupt register means includes a plurality of storage locations which correspond one-to-one with said interrupt sources;

said group register means includes a plurality of storage locations which correspond one-to-one with said groups of said interrupt sources; and said association means includes a plurality of association registers which is equal in number to said plurality of storage locations of said group register means.

14. A data processing system according to claim 13; wherein said association means further includes a plurality of gating means including a respective gating means connected to each of said association registers for gating signals stored in said association registers with signals stored in said storage locations of said interrupt register means to produce said group signals.

15. A data processing system according to claim 14; wherein each of said association registers has a plurality of storage locations equal in number to said storage locations of said interrupt register means.

16. A data processing system comprising:

processor means for receiving and processing interrupt signals originating from a plurality of interrupt sources;

interrupt register means for receiving and storing respective interrupt source signals indicative of said interrupt sources;

association means for establishing groups of said interrupt sources in response to programming signals from said processor means, said groups of said interrupt sources consisting of a first priority group and a second group, said first priority group consisting of a single one of said interrupt sources and said second group consisting of all others of said interrupt sources;

group register means responsive to said association means for receiving and storing a plurality of group signals each of which is indicative of storage in said interrupt register means of an interrupt source signal from at least one interrupt source of a corresponding one of said groups of interrupt sources; and means for transmitting an interrupt signal to said processor means when said interrupt register means receives an interrupt source signal;

said processor means being programmed to send said programming signals to said association means such that said association means establishes said groups of said interrupt sources on the basis of an operating condition of said data processing system, and said processor means being programmed to respond to receipt of said interrupt signal from said means for transmitting by determining whether the group signal which corresponds to said first priority group is stored in said group register means and, if so, performing a predetermined routine for handling an interrupt originating from said single one of said interrupt sources without reading said interrupt register means.

17. A data processing system according to claim 16; wherein said processor means also responds to receipt of said interrupt signal from said means for transmitting by determining whether the group signal which corresponds to said second group is stored in said group register means.

18. A data processing system according to claim 16; wherein said predetermined routine for handling an interrupt originating from said single one of said interrupt sources includes sending programming signals to said association means such that one of said interrupt sources of said second group is reassigned to said first priority group in place of said single one of said interrupt sources, and said single one of said interrupt sources is reassigned to said second group.

* * * * *